(12) United States Patent
Resnick et al.

(10) Patent No.: US 7,243,071 B1
(45) Date of Patent: Jul. 10, 2007

(54) SPEECH-RECOGNITION GRAMMAR ANALYSIS

(75) Inventors: David I. Resnick, Belmont, MA (US); Nina Zinovieva, Lowell, MA (US)

(73) Assignee: Comverse, Inc., Wakefield, MA (US)

( * ) Notice: Subject to any disclaimer, the term of this patent is extended or adjusted under 35 U.S.C. 154(b) by 816 days.

(21) Appl. No.: 10/345,853

(22) Filed: Jan. 16, 2003

(51) Int. Cl.
G10L 11/00 (2006.01)
G10L 15/00 (2006.01)
G10L 15/18 (2006.01)

(52) U.S. Cl. .................. 704/257; 704/251; 704/270
(58) Field of Classification Search ............... 704/231, 704/257
See application file for complete search history.

(56) References Cited

U.S. PATENT DOCUMENTS

| | | | |
|---|---|---|---|
| 5,566,272 A | 10/1996 | Brems et al. | 395/2.4 |
| 5,819,220 A * | 10/1998 | Sarukkai et al. | 704/270.1 |
| 6,119,087 A | 9/2000 | Kuhn et al. | 704/270 |
| 6,125,345 A | 9/2000 | Modi et al. | 704/240 |
| 6,182,039 B1 * | 1/2001 | Rigazio et al. | 704/257 |
| 6,224,383 B1 | 5/2001 | Shannon | 434/156 |
| 6,233,553 B1 | 5/2001 | Contolini et al. | 704/220 |
| 6,275,799 B1 * | 8/2001 | Iso | 704/244 |
| 6,314,402 B1 | 11/2001 | Monaco et al. | 704/275 |
| 6,426,956 B1 * | 7/2002 | Eteminan | 370/401 |
| 2001/0013001 A1 * | 8/2001 | Brown et al. | 704/270.1 |
| 2002/0032549 A1 | 3/2002 | Axelrod et al. | 702/3 |
| 2002/0032564 A1 * | 3/2002 | Ehsani et al. | 704/235 |
| 2002/0169604 A1 * | 11/2002 | Damiba et al. | 704/231 |

FOREIGN PATENT DOCUMENTS

| | | |
|---|---|---|
| WO | WO 97/37481 | 10/1997 |
| WO | WO 00/23983 | 4/2000 |
| WO | WO 01/37126 A2 | 5/2001 |

OTHER PUBLICATIONS

Mostow, Jack, Hauptmann, Alexander G., Roth, Steven F. "Demonstration of a Reading Coach that Listens." UIST '95 p. 77-78. Nov. 14-17, 1995.*

* cited by examiner

Primary Examiner—David Hudspeth
Assistant Examiner—Justin W Rider
(74) Attorney, Agent, or Firm—Mintz, Levin, Cohn, Ferris, Glovsky and Popeo, P.C.

(57) ABSTRACT

An apparatus for determining at least one recognition parameter, associated with a grammar, for use in attempting to recognize utterances using the grammar includes an input configured to receive indicia of the grammar, an output configured to provide the at least one recognition parameter, and a processor coupled to the input and to the output and configured to analyze words of the grammar to determine a feature of the grammar and to provide indicia of the at least one recognition parameter to the output based on the determined feature.

7 Claims, 4 Drawing Sheets

| Grammar type | Perplexity | Word Length | Grammar example |
|---|---|---|---|
| 1 | High | long | broad top level menu of an application |
| 2 | High | short | phone numbers passcodes |
| 3 | Low | long | company or movie names |
| 4 | Low | short | yes and no |

FIG. 2

|  | Low Perplexity | High Perplexity |
|---|---|---|
| Short word length | Grammar Type 4<br>relatively-low word-internal acoustic evaluation<br>relatively-high word-boundary acoustic evaluation<br>multiple acoustic models<br>shorten timeouts<br>no pruning | Grammar Type 2<br>high confidence level<br>increase pruning<br>relatively-high word-boundary and word-internal acoustic evaluation<br>increase timeouts |
| Long word length | Grammar Type 3<br>low confidence level<br>decrease noise reduction<br>relatively-low word-internal acoustic evaluation | Grammar Type 1<br>Medium confidence level<br>Increase pruning<br>relatively-low word-internal acoustic evaluation<br>increase timeouts<br>relatively-low word-boundary acoustic evaluation |

FIG. 3

SPEECH-RECOGNITION GRAMMAR ANALYSIS

FIELD OF THE INVENTION

The invention relates to speech recognition and more particularly to techniques for improving speech recognition accuracy.

BACKGROUND OF THE INVENTION

Speech recognizers are systems for identifying a user utterance based on two sources of information: acoustic models and language models that can be either statistically-based grammars or closed grammars. Language models or grammars are used to provide phrase hypotheses, while acoustic models are used to provide acoustic descriptions of phoneme strings of phrase hypotheses in probabilistic terms.

Speech recognition is a process of searching for the best match of an input utterance to all possible phrase hypotheses created from the language models or grammars. So, more complex grammars provide more phrase hypotheses that make recognition processing take more time and consume more resources, and in many cases make the recognition less accurate.

The speech recognizer typically allows for a wide variety of speech recognition parameters to be set. For example, recognizer parameters include parameters set at recognition time such as confidence level, pruning, and noise reduction, and those set at compile time such as whether to use crossword compilation and/or multiple acoustic models. Pruning values affect the number of hypotheses that the recognizer will use to attempt to recognize an utterance. There is an accuracy/processing load tradeoff, with increased pruning decreasing accuracy and reducing processing load and vice versa. Noise reduction is the process of reducing background noise (for example, from a noisy restaurant or due to the method of transmission) from an audio stream. With less background noise, the recognition may be more accurate. Noise reduction, however, requires time and system resources, and parts of the speech signal may be inadvertently removed, reducing recognition accuracy. Using crossword compilation increases the processing load but can improve accuracy in recognizing series of short words. Whether to use multiple acoustic models is another recognition parameter that may be set. Using multiple acoustic models, the recognizer will attempt to recognize the same utterance with multiple recognition models including generic models and models that are tuned for different criteria, e.g., environment, gender, accent, etc. Using multiple acoustic models, the best result from the multiple recognition attempts is used as the recognized result. Whether to use skip frames is still another recognition parameter. Using skip frames, every other 10 ms (or other applicable time increment) spectral/cepstral-analyzed portion (i.e., the frame) of an utterance is ignored by the recognizer. This decreases both accuracy and processor load, although accuracy may not suffer depending upon the utterance and the grammar.

These parameters may be hard-coded by an Interactive Voice Response (IVR) system using the recognizer or provided with an external grammar. If no parameters are provided, default recognition parameters may be used.

SUMMARY OF THE INVENTION

In general, in an aspect, the invention provides an apparatus for determining at least one recognition parameter, associated with a grammar, for use in attempting to recognize utterances using the grammar. The apparatus includes an input configured to receive indicia of the grammar, an output configured to provide the at least one recognition parameter, and a processor coupled to the input and to the output and configured to analyze words of the grammar to determine a feature of the grammar and to provide indicia of the at least one recognition parameter to the output based on the determined feature.

Implementations of the invention may include one or more of the following features. The processor is configured to analyze the grammar to determine at least one of perplexity, word length, confusability, and prevalence of numbers associated with the grammar. The processor is configured to determine both the perplexity and the word length associated with the grammar. The processor is configured to determine a category of the grammar based on the determined perplexity and word length. The processor is configured to provide at least one predetermined recognition parameter value based on the determined category of the grammar. The processor is configured to determine confusability and prevalence of numbers. The processor is configured to provide a timeout value if the processor determines that the grammar has a high prevalence of numbers and to provide an indication to use relatively-low word-internal acoustic evaluation if the processor determines that the grammar has a high confusability.

Implementations of the invention may also include one or more of the following features. The recognition parameters include at least one of confidence level, pruning, noise reduction, word-boundary acoustic evaluation, word-internal acoustic evaluation, model selection, and timeout values. The apparatus is one of an IVR, with the input configured to be coupled to a packet-switched communication network and the output configured to communicate with a speech recognizer, and a speech recognizer, with the input and output configured to communicate with an IVR.

In general, in another aspect, the invention provides a computer program product for use with a grammar to determine at least one recognition parameter of the grammar for use in attempting to recognize utterances using the grammar, the computer program product residing on a computer-readable medium and comprising computer-readable and computer-executable instructions for causing the computer to receive indicia of the grammar, analyze words of the grammar to determine a feature of the grammar, and output indicia of the at least one recognition parameter based on the determined feature.

Implementations of the invention may include one or more of the following features. The instructions for causing the computer to analyze words cause the computer to determine at least one of perplexity, word length, confusability, and prevalence of numbers associated with the grammar. The instructions for causing the computer to analyze words cause the computer to determine both the perplexity and the word length associated with the grammar. The instructions for causing the computer to analyze words cause the computer to determine a category of the grammar based on the determined perplexity and word length. The instructions for causing the computer to output India cause the computer to provide at least one predetermined recognition parameter value based on the determined category of the grammar. The instructions for causing the computer to analyze words cause the computer to determine confusability and prevalence of numbers. The instructions for causing the computer to analyze words cause the computer to provide a timeout value if the grammar has a high prevalence of numbers and to provide an indication to use relatively-low word-internal acoustic evaluation if the grammar has a high confusability.

In general, in another aspect, the invention provides an Interactive Voice Response (IVR) system including an input for receiving an utterance, a first module configured to analyze portions of a grammar to determine at least one feature of the grammar and to provide at least one potential speech recognition parameter value in accordance with the at least one feature, and a second module coupled to the first module and the input and configured to apply a speech model in accordance with the at least one potential speech recognition parameter value to attempt to recognize the utterance.

Implementations of the invention may include one or more of the following features. The at least one feature includes at least one of perplexity, average word length, confusability, and relative prevalence of numbers in the grammar. The at least one feature includes both perplexity and average word length. The at least one potential speech recognition parameter includes indicia of at least one of: whether to use relatively high or low word-internal acoustic evaluation, at least one timeout length, a confidence level, a pruning amount, noise reduction, whether to use multiple acoustic models, and whether to use relatively high or low word-boundary acoustic evaluation. The first module is configured to categorize the grammar into one of four categories based on whether the perplexity is high or low and whether the average word length is long or short. The first module is configured to provide predetermined values of the at least one potential speech recognition parameter based on the category of the grammar.

Implementations of the invention may also include one or more of the following features. The at least one potential speech recognition parameter includes indicia of at least one of: whether to use relatively high or low word-internal acoustic evaluation, at least one timeout length, a confidence level, a pruning amount, noise reduction, whether to use multiple acoustic models, and whether to use relatively high or low word-boundary acoustic evaluation. The first module is configured to provide recognition parameters indicating to use multiple acoustic models and to use relatively-low word-internal acoustic evaluation if a confusability of the grammar is high, and indicating to use at least one long timeout if a prevalence of numbers in the grammar is high. The first module is configured to determine at least some recognition parameters in accordance with a constraint associated with the grammar. The IVR system includes a grammar input configured to couple to a telecommunications medium for receiving a grammar from a remote location. The first module is configured to determine a grammar parameter provided in association with a VoiceXML file and to avoid using a potential speech recognition parameter value that conflicts with the provided grammar parameter.

Embodiments of the invention can automatically determine how to set compiler and runtime recognition parameters by looking at a combination of grammar features, such as grammar perplexity, average word length, and grammar confusability.

Various aspects of the invention may provide one or more of the following advantages. Speech recognition accuracy may be improved without unduly increasing processor load. Speech recognition applications can adapt to grammars to help improve recognition (e.g., speed and/or accuracy). Initial recognition parameters for a grammar may be determined automatically, as well as recognition parameters for externally-supplied grammars. Recognition parameters may be determined in accordance with characteristics of an externally-supplied grammar while also comporting with a grammar parameter that may affect multiple recognition parameters. Recognition parameters may be determined during speech application development or at the run time of the IVR.

These and other advantages of the invention, along with the invention itself, will be more fully understood after a review of the following figures, detailed description, and claims.

BRIEF DESCRIPTION OF THE FIGURES

FIG. 2 is a table of grammar types.

FIG. 3 is a table of speech recognition parameters to be set corresponding to grammar types.

DETAILED DESCRIPTION OF PREFERRED EMBODIMENTS

Figure 1:
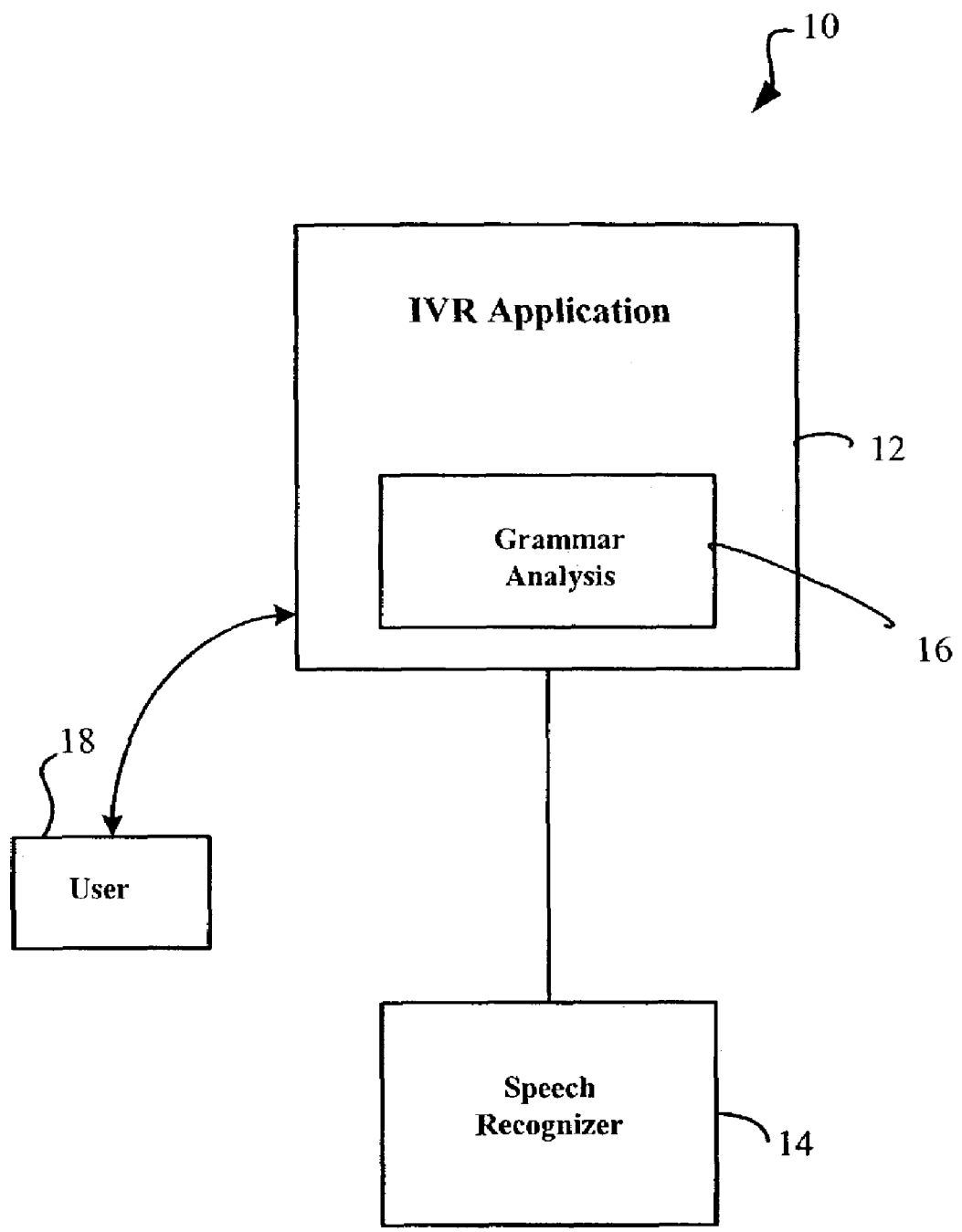
FIG. 1 is a block diagram of an interactive voice response system.

The invention relates to analyzing a grammar to determine recognition parameters for a speech recognizer to help improve performance of the recognizer compared to using non-customized recognition parameters. The analysis categorizes the grammar according to features of the grammar such as perplexity level and average word length. Depending on the category of the grammar, different recognition parameters are suggested for use in recognizing utterances using the grammar. The confusability level and percentage of numbers in the grammar may be used to set other recognition parameters (e.g., timeout values, skip frames, etc.) although they may not affect the category of the grammar. The suggested recognition parameters are derived through experimentation by testing utterances against grammars using different recognition parameters and evaluating the quality of recognition and the amount of processing power used in the recognition process. This testing also yields thresholds for grammar features (e.g., perplexity, word length, etc.) for use in categorizing grammars. The thresholds may be determined, e.g., by performing experiments with various recognizers attempting to recognize a variety of utterances using different recognition parameters. The results of the recognition attempts can be analyzed to determine relevant characteristics such as the accuracy, speed, and processor load for each attempt. From these analyses, thresholds for categorizing grammars may be determined. The thresholds will likely vary from recognizer to recognizer (e.g., from different manufacturers or different recognizers from the same manufacturer). Actual values of the recognition parameters also may vary between recognizers, so suggested recognition parameter values are customized to the particular recognizer in question, or are provided in a relative manner (e.g., high/low) with the recognizer setting the actual value.

The invention can be applied to grammars internal or external to an IVR system and can be applied during speech application development or at the run time of the recognizer (by the speech application using the recognizer or by the recognizer itself). During development, the invention could be used, e.g., to analyze an internal grammar to determine initial recognition parameter settings or to determine settings to supply with a VoiceXML file. For run-time use, the invention can analyze a grammar, such as an external VoiceXML grammar, to provide suggestions for recognition settings, although the invention preferably does not alter any settings supplied with the VoiceXML grammar.

Where a supplied VoiceXML parameter applies to a group of multiple recognizer parameters, the invention can be used to analyze a grammar and intelligently set individual recognizer parameters within the group based upon the grammar analysis while conforming to the supplied VoiceXML parameter value. For example, the Voice XML 2.0 standard provides for a speedvsaccuracy parameter that may map to multiple recognizer parameters such as pruning, crossword compilation, and skip frames. If a value for the speedvsaccuracy parameter is provided, e.g., 0.5, then the invention analyzes the grammar to determine values for pruning, crossword compilation, and skip frames that comport with the grammar analysis and that will provide performance with a speedvsaccuracy value of approximately 0.5.

Referring to FIG. 1, an IVR system 10 includes an IVR application 12 and a speech recognizer 14 connected to the IVR application 12. The IVR application 12 includes a grammar analysis module 16. The IVR application 12 may be implemented using a processor controlled by software instructions. Any of a variety of processors presently available or developed in the future are acceptable platforms for the IVR application 12 including the grammar analysis module 16. Although the module 16 is shown external to the recognizer 14, the module 16 may be partially or wholly within the recognizer 14, or elsewhere in the system 10.

The system 10 is configured to interact with a user 18 to attempt to recognize utterances from the user and to take appropriate actions. The user 18 may interact with the system 10, e.g., through a phone, to hear prompts played by the application 12 and to provide utterances to the application 12. The application 12 is configured to supply the user's utterances to the recognizer 14. The recognizer 14 is configured to attempt to find the best match of the user's utterances to the acoustic models of phoneme strings in accordance with applicable grammars. The recognizer 14 is also configured to compile grammars in accordance with recognition parameters to determine the possible phrase hypotheses represented as phoneme strings to be used in attempting to match with the user's utterances.

The grammar module 16 is configured to analyze various features of a grammar. These features preferably, but not necessarily, include grammar perplexity, average word length, grammar confusability, and percentage of numbers in the grammar. Grammar perplexity relates to the number of possible strings of acceptable utterances. The perplexity of the grammar is the weighted average number of choices at any point in the sentence. It is computed by the module 16 as a function of entropy H:

$$H(X) = -\mathrm{SUM}(P(x)\log 2P(x))$$

for each x of set X (i.e., the set of all utterances produced by the grammar). So, the greater the grammar perplexity, the greater the potential error rate with recognition. The module 16 is further configured to determine average word length of grammars by, e.g., determining the average length, in phonemes, of words in the grammar using different methods. For languages with phoneme-based writing systems this estimation can be done by evaluating number of characters, for other languages, more complicated algorithms can be used.

The module 16 is further configured to use values indicative of the analyzed features to categorize the analyzed grammar. For example, the module 16 can compare the various feature values against corresponding thresholds to determine which of various categories applies to the analyzed grammar. Referring also to FIG. 2, a table 30 shows four exemplary grammar categories/types of (1) high perplexity and long average word length, (2) high perplexity and short average word length, (3) low perplexity and long average word length, and (4) low perplexity and short average word length. As indicated, examples of the various grammar types include broad, top level menus of application for type 1, phone numbers and passcodes for type 2, company or movie names for type 3, and yes and no answers and/or digits for type 4.

Based on the grammar type, the module 16 is configured to provide recognition parameter suggestions to the recognizer 14. The same experiments that yielded the thresholds for the grammar types may also yield values for recognition parameters for each of the grammar types. The recognition parameter values, as with the threshold values, will likely vary between different recognizers. Referring to FIGS. 1 and 3, a table 40 indicates recognition parameter values/suggestions for each of the grammar categories shown in FIG. 2. For grammar type 1, with high perplexity and long average word length, the following suggestions are provided: set a pruning value relatively high, limit evaluation of acoustic features on word boundaries (e.g. do not use crossword compilation), use relatively-low word-internal acoustic evaluation (e.g. use skip frames), increase timeouts, and use a medium confidence level. For grammar type 2, the suggested recognition parameters are: prune more hypotheses, increase evaluation of acoustic features on word boundaries (e.g. use crossword compilation), use relatively-high word-internal acoustic evaluation (e.g., do not skip frames), increase timeouts, and use a high confidence level. For grammar type 3, the suggestions are: use relatively-low word-internal acoustic evaluation, decrease noise reduction, and use a low confidence level. For grammar type 4, the suggestions are: nor pruning, increase evaluation of acoustic features on word boundaries, use multiple acoustic models, and shorten timeouts.

The module 16 is configured to analyze grammars for further features for providing suggestions for other recognition parameters, and possibly overriding the suggestions based upon the grammar type. For example, percentage of grammar words that do not appear in a dictionary may be analyzed. Additionally, the module 16 can determine the percentage of numbers in a grammar, e.g., by looking for digit strings in the grammar. If the percentage of numbers in the grammar is sufficiently high, e.g., exceeds a threshold, or if the grammar contains a high percentage of names (words not found in the dictionary), the fluency of utterances associated with this grammar will likely be low and the module 16 can suggest using a relatively high timeout value for the end of speech. Timeout values include timeouts for the start of speech, end of speech, and maximum allowable speech length.

Figure 4:
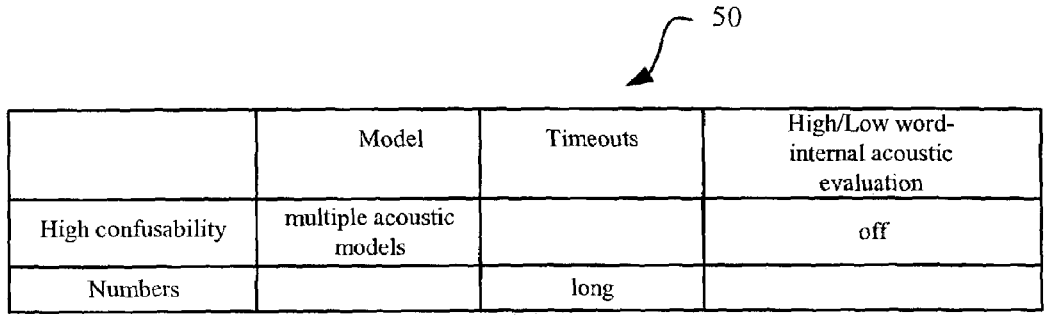
FIG. 4 is a table of speech recognition parameters to be set based on grammar features.

The module 16 may also suggest turning off skip frames if the module 16 determines that the grammar has a high confusability, thus preserving as many features of the utterances as possible. Grammar confusability relates to how likely it is that different grammar items will be confused by the recognizer 14 for each other. This may be determined by analysis of similarities in phoneme strings, although other techniques are possible. Furthermore, different recognition servers may be suggested by the module 16. Different recognition servers will have different performance characteristics such as accuracy, speed, processor load, whether it applies multipass models, how it is trained, etc. The module 16 may suggest which recognition server the recognizer 14 should use. For example, the module 16 may suggest a recognition server that applies multipass models if the grammar is in category 4, may suggest a particular model or models to use, or may suggest a non-complex model for grammars of category 1. Thus, referring to FIGS. 1 and 4, a table 50 indicates that the module 16 may suggest that multiple accoustic models be applied and that skip frames not be used for highly-confusable grammars and that long timeouts be used for grammars dominated by numbers. These suggestions may take priority over other suggestions that have been or will be determined by the module 16 categorizing the grammar.

The grammar analyzed by the module 16 may be internal (part of the system 10) or external (provided to the system 10). In the case of an internal grammar, the module 16 may analyze the grammar and provide suggestions for initial recognition parameter settings for future recognition. If the grammar is to be supplied as an external grammar to another system, then the suggested settings may be supplied with the grammar as suggestions for a recognizer to use with the grammar. For example, the module 16 may analyze VoiceXML pages and provide recognition parameter settings, and the VoiceXML page may be modified to provide these suggestions along with the grammar of the VoiceXML page. In the case of an external grammar (including but not limited to VoiceXML grammars), the module 16 may determine suggestions for recognition parameters independently of, or dependent on, indicia provided with the external grammar, and may or may not supercede any parameters provided with the external grammar. For example, the VoiceXML 2.0 standard allows an application to specify some values for use by the recognizer 14. If these values are provided, then the module 16 preferably will not supercede them, but may provide suggestions for augmenting or superceding them. If these values are not provided by the external grammar, then the module 16 preferably provides suggestions for them. Furthermore, as discussed above, the VoiceXML 2.0 standard (or other external grammar format) may provide grammar parameters (e.g., speedvsaccuracy) that affect multiple recognition parameters (e.g., pruning, crossword compilation, and skip frames for speedvsaccuracy). For these grammar parameters, the module 16 can compute suggestions for affected recognition parameters such that the value provided for the grammar parameter is met by the recognizer's performance.

Figure 5:
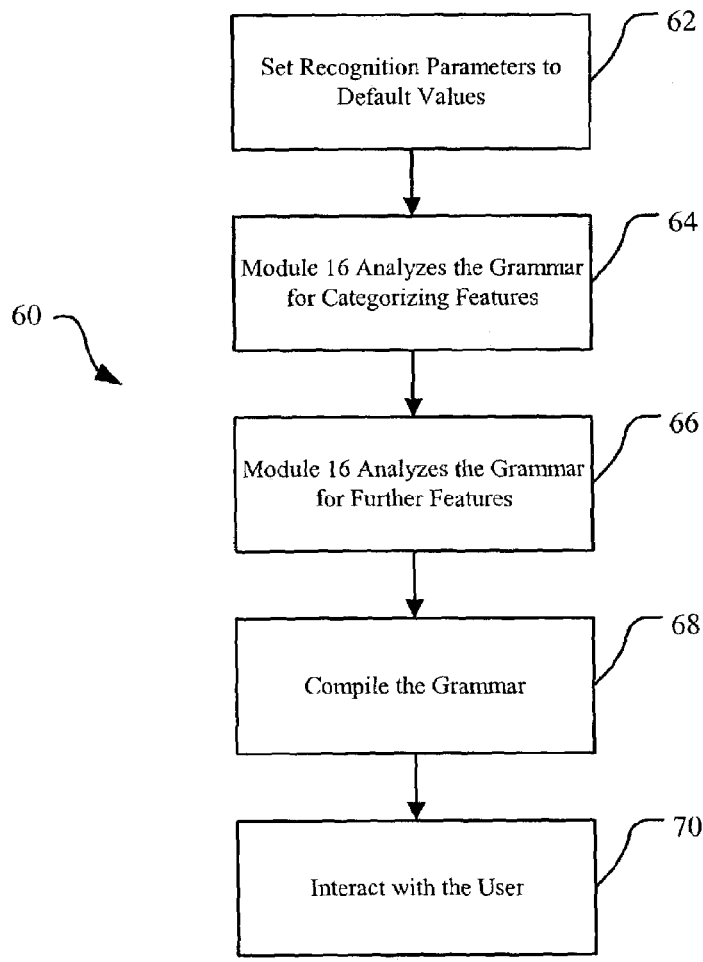
FIG. 5 is a block flow diagram of a process of analyzing a grammar and providing speech recognition parameters based on the analysis.

In operation, referring to FIG. 5, with further reference to FIGS. 1-4, a process 60 for analyzing a grammar and providing recognition parameter settings using the system 10 includes the stages shown. The process 60, however, is exemplary only and not limiting. The process 60 can be altered, e.g., by having stages added, removed, or rearranged (e.g., by having stage 64 discussed below preceded by stage 66 discussed below).

Figure 6:
FIG. 6 is a table of default speech recognition parameters.

At stage 62, recognition parameters are set to default values designed to accommodate a variety of grammars. Referring also to FIG. 6, a table 80 shows initial default recognition parameters. As shown, the recognizer 14 is initially set with a medium confidence level, noise reduction on, pruning off, crossword compilation off, a basic model or models selected, skip frames off, and timeouts normal.

At stage 64, a grammar is analyzed by the module 16 to determine initial recognition parameter suggestions. The grammar may be internal to the system 10 or supplied to the system 10 from outside. The module 16 applies its various algorithms or other techniques for quantizing features of the grammar and compares the determined quantities with thresholds. Based on the comparisons for perplexity and average word length, the module 16 categorizes the grammar into one of four types according to the table 30 shown in FIG. 2. Based on the type of the grammar and the particular recognizer 14 to be used, the module 16 provides initial suggestions for recognition parameters in accordance with the table 40 shown in FIG. 3. Recognition parameters may be calculated based upon parameters associated with the grammar, e.g., a speedvsaccuracy or other parameter provided with an external grammar.

At stage 66, further grammar features are analyzed and superceding recognition parameter values provided as appropriate. Other features such as confusability and predominance of numbers in the grammar are evaluated by the module 16 and quantities associated with the evaluations are compared to thresholds. Based on these comparisons, overriding recognition parameter value suggestions may be provided, e.g., as shown in the table 50 of FIG. 4.

At stage 68, the grammar is compiled. This may occur well in advance of the grammar being used by the recognizer (e.g., during development of a speech application) or relatively close in time to being used by the recognizer 14 (e.g., at run time if the grammar is externally supplied to the system 10).

At stage 70, the system 10 interacts with the user 18. The suggested recognition parameters from the module 16 are applied by the recognizer 14. If, however, a recognition parameter was provided with an externally-supplied grammar, the recognizer 14 preferably will not use the corresponding recognition parameter value suggested by the module 16.

Other embodiments are within the scope and spirit of the appended claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. Also, while the system 10 shows the module 16 being part of a larger IVR system, the module 16 may be a stand alone entity for evaluating grammars. As a stand alone entity, the module 16 can have an input for receiving a grammar from a local IVR system, or from a remote device. The input can be configured to connect to short or long-distance transmission lines such as Ethernet, USB, or T1 lines, or other communication lines. The module 16 also has an output configured to connect to similar transmission lines for providing its determined recognition parameters hints/suggestions. In an integral setup, e.g., as shown in FIG. 1, the module 16 still has an input for receiving a grammar and an output for providing its hints. In this configuration, the input and output are preferably configured to connect to local transmission lines such as printed circuit lines.

ThoughVoiceXML is mentioned above, the invention is not limited to VoiceXML, but rather includes any method of supplying external grammars, with or without associated parameters.

What is claimed is:

1. An apparatus for determining at least one recognition parameter, associated with a grammar, for use in attempting to recognize utterances using the grammar, the apparatus comprising:

an input receiving indicia of the grammar;
an output providing the at least one recognition parameter;
a processor coupled to the input and to the output;
a memory including computer executable instructions that, when executed by the processor, cause the processor to:
analyze words of the grammar to determine a feature of the grammar wherein the feature includes at least one of perplexity, word length, confusability, and prevalence of numbers associated with the grammar;
provide indicia of the at least one recognition parameter to the output based on the determined feature;
determine at least the perplexity and the word length associated with the grammar; and
determine a category of the grammar based on the determined perplexity and word length.

2. The apparatus of claim 1 wherein the computer readable instructions, when executed, further cause the processor to provide at least one predetermined recognition parameter value based on the determined category of the grammar.

3. The apparatus of claim 1 wherein the computer readable instructions, when executed, further cause the processor to determine confusability and prevalence of numbers.

4. A computer program product for use with a grammar to determine at least one recognition parameter of the grammar for use in attempting to recognize utterances using the grammar, the computer program product residing on a computer-readable medium and comprising computer-readable and computer-executable instructions for causing the computer to:

receive indicia of the grammar;
analyze words of the grammar to determine a feature of the grammar; and
output indicia of the at least one recognition parameter based on the determined feature;
wherein the feature includes at least one of perplexity, word length, confusability, and prevalence of numbers associated with the grammar;
wherein the instructions for causing the computer to analyze words cause the computer to determine at least the perplexity and the word length associated with the grammar; and
wherein the instructions for causing the computer to analyze words cause the computer to determine a category of the grammar based on the determined perplexity and word length.

5. The computer program product of claim 4 wherein the instructions for causing the computer to output indicia cause the computer to provide at least one predetermined recognition parameter value based on the determined category of the grammar.

6. An Interactive Voice Response (IVR) system comprising:

an input for receiving an utterance;
a first module to analyze portions of a grammar to determine at least one feature of the grammar and to provide at least one potential speech recognition parameter value in accordance with the at least one feature; and
a second module coupled to the first module and the input, the second module applies a speech model in accordance with the at least one potential speech recognition parameter value to attempt to recognize the utterance;
wherein the at least one feature includes at least one of perplexity, average word length, confusability, and relative prevalence of numbers in the grammar;
wherein the at least one feature includes at least perplexity and average word length;
wherein the at least one potential speech recognition parameter includes indicia of at least one of: whether to use relatively high or low word-internal acoustic evaluation, at least one timeout length, a confidence level, a pruning amount, noise reduction, whether to use multiple acoustic models, and whether to use relatively high or low word-boundary acoustic evaluation; and
wherein the first module categorizes the grammar into one of four categories based on whether the perplexity is high or low and whether the average word length is long or short.

7. The system of claim 6 wherein the first module is configured to provide predetermined values of the at least one potential speech recognition parameter based on the category of the grammar.

* * * * *